United States Patent
Han et al.

(10) Patent No.: US 9,100,202 B2
(45) Date of Patent: Aug. 4, 2015

(54) MESSAGE ROUTING BASED ON MODELED SEMANTIC RELATIONSHIPS

(75) Inventors: Qiang Han, DB Ashtown (IE); Sean O'Sullivan, DB Kimmage (IE)

(73) Assignee: Business Objects Software Limited, Dublin (IE)

( * ) Notice: Subject to any disclaimer, the term of this patent is extended or adjusted under 35 U.S.C. 154(b) by 605 days.

(21) Appl. No.: 12/949,237

(22) Filed: Nov. 18, 2010

(65) Prior Publication Data

US 2012/0131597 A1    May 24, 2012

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *H04L 12/18* | (2006.01) |
| *G06F 9/54* | (2006.01) |
| *H04L 12/58* | (2006.01) |

(52) U.S. Cl.
CPC ............ *H04L 12/1859* (2013.01); *G06F 9/546* (2013.01); *H04L 51/14* (2013.01)

(58) Field of Classification Search
None
See application file for complete search history.

(56) References Cited

U.S. PATENT DOCUMENTS

2011/0161469 A1 *   6/2011   De Amorim et al. ......... 709/220

OTHER PUBLICATIONS

Binildas A. Christudas, "Service Oriented Java Business Integration", Packet Publishing, Feb. 2008, ISBN 1847194400, ISBN 978-1-847194-40-4, (Cover page 3pgs. + Credits 1pg. + About the Author 1pg. + Acknowledgement 2pgs. + About the Reviewers 1pg. + Table of Contents (i-x, total 10pgs) + Preface pp. 1-6, total 6pgs.) + pp. 7-417, total 436 pages).

David A. Chappell, "Enterprise Service Bus", O'Reilly, Jun. 2004, ISBN 0-596-00675-6, (Cover page 5pgs. + Contents 3pgs. + Foreword 2pgs. + Preface 13pgs. + pp. 1-248, total 270 pages).

(Continued)

*Primary Examiner* — Craig Dorais
(74) *Attorney, Agent, or Firm* — Buckley, Maschoff & Talwalkar LLC (57) ABSTRACT

A system to determine a hierarchical model comprising two or more associated nodes, each of the nodes associated with one or more message producers and one or more message consumers, receive a message from one of the one or more message producers; and route the message to one or more of the one or more message consumers based on the hierarchical model. The hierarchical model may include a root node and a plurality of nodes descending from the root node, the plurality of nodes including the two or more associated nodes, wherein each of the plurality of nodes is associated with a topic, a parent node, one or more child nodes, one or more message producers, and one or more message consumers. Routing the message may comprise traversing two or more nodes of the hierarchical model based on first logic.

12 Claims, 10 Drawing Sheets

(56) References Cited

OTHER PUBLICATIONS

"Enterprise Service Bus (ESB): The Interconneciton Infractructure for SOA", Safelayer Labs, retrieved date Nov. 18, 2010, download from http://labs.safelayer.com/en/technology/16-trustedx/386-esbsoi, 1pg.

Dave Chappell, "EBS Myth Busters: 10 Enterprise Service Bus Myths Debunked—Clarity of Definition for a Growing Phenomenon", May 25, 2005, retrieved date Nov. 18, 2010, download from http://soa.sys-con.com/node/48035/pring. 7pgs.

"Design Patterns", IBM Research, retrieved date Nov. 18, 2010, download from http://www.research.ibm.com/designpatterns/example.htm, 11pgs.

Jean-Paul Boodhoo, "Design Patterns: Model View Presenter", (Aug. 2006), Copyright 2010 Microsoft Corporation, retrieved date Nov. 18, 2010, download from http://msdn.microsoft.com/en-us/magazine/cc188690 (print).aspx, 11pgs.

Patrick Th. Eugster et al., "The Many Faces of Publish/Subscribe", ACM Computing Surveys, vol. 35, No. 2, Jun. 2003, (pp. 114-131, total 18 pages).

* cited by examiner

MESSAGE ROUTING BASED ON MODELED SEMANTIC RELATIONSHIPS

BACKGROUND

Messaging is a generic term referring to protocols which enable communication between software components or applications. Conventional messaging enables distributed communication that is loosely coupled, since messaging clients (i.e., message producers and message consumers) are not required to possess any knowledge of one another. Rather, such producers and consumers need only be aware of agreed destinations and messaging formats. Consequently, a messaging client can send messages to, and receive messages from, any other messaging client.

Figure 1A:
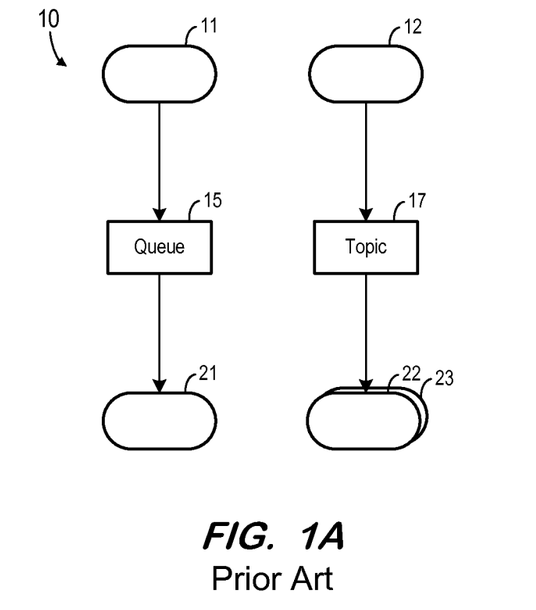
FIG. 1A is a block diagram illustrating prior art messaging systems.

Messaging protocols include queue-based protocols, topic-based publish/subscribe protocols, and messaging bus-based protocols. Queue and topic-based protocols link message producers and message consumers using queue names or topic names. FIG. 1A illustrates system 10 including two message channels which provide communication between producers 11, 12 and consumers 21-23 using, respectively, queue and topic-based protocols. Queue 15 enforces a one-to-one relationship between message producer 11 and message consumer 21. Accordingly, once a message is received at queue 15 and transmitted to consumer 21, that message becomes unavailable to any other consumer.

A topic-based protocol, on the other hand, implies a one-to-many relationship between a message producer and message consumers. For example, a message transmitted by message producer 12 and associated with topic 17 is delivered to message consumers 22 and 23, both of whom are associated with topic 17 (e.g., through a registration/subscription process). According to the protocols illustrated in FIG. 1A, a queue name or a topic name provides the only indication of a semantic relationship between a producer of a message and its consumer(s). No semantic relationships are defined between producers or between consumers. Accordingly, each queue- or topic-based message channel exists as a substantially independent entity, even though logical relationships may exist between producers and/or consumers of the message channels.

Figure 1B:
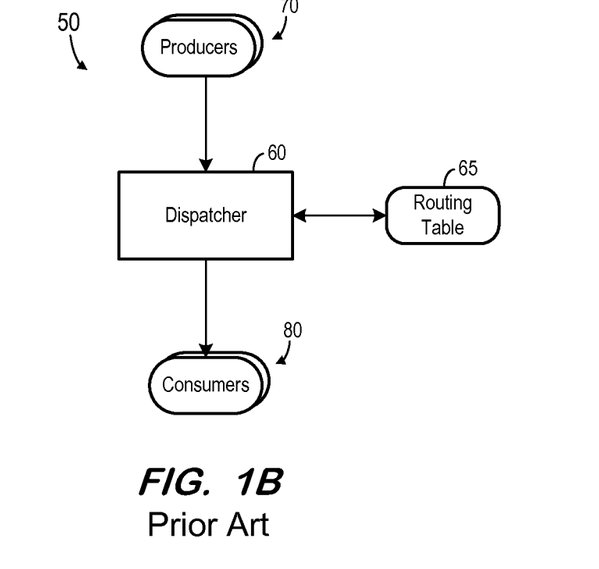
FIG. 1B is a block diagram illustrating a prior art messaging system.

A message bus-based protocol, such as Model-View-Controller, may utilize a central component to route messages between producers and consumers. FIG. 1B illustrates system 50 implementing such a protocol, wherein dispatcher 60 uses routing table 65 to route messages between producers 70 and consumers 80. For example, routing table 65 may associate event ids with one or more consumers. A producer 70 may publish an event along with an event id, and dispatcher 60 may determine the consumers 80 which are associated with the event id in routing table 65 and transmit the event to those consumers 80.

As described with respect to system 10, system 50 also falls short of effectively defining semantic relationships between producers, between consumers, between producers and consumers, and between message channels (e.g., represented by individual event ids). In view of the foregoing, what is needed is a messaging system to efficiently model semantic relationships among message producers and message consumers. Such a system may enable the application of semantically-meaningful routing and filtering algorithms to efficiently leverage these modeled relationships.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 2:
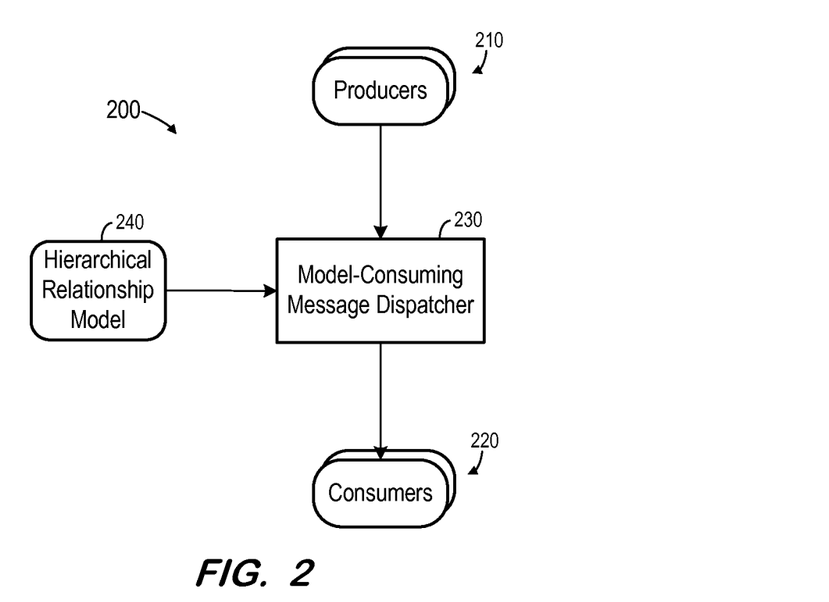
FIG. 2 is a block diagram illustrating a messaging system according to some embodiments.

FIG. 2 is a block diagram of system 200 according to some embodiments. FIG. 2 represents a logical architecture for describing some embodiments, and actual implementations may include more or different components arranged in any manner. System 200 may be implemented using any number of computing devices, and one or more processors within system 200 may execute program code to cause corresponding computing devices to perform processes described herein. For example, a single computing device may embody all elements of system 200.

Generally, each logical component described herein may be implemented by any number of devices coupled via any number of public and/or private networks. Two or more of such devices may be located remote from one another and may communicate with one another via any known manner of network(s) and/or via a dedicated connection. Moreover, each logical component may comprise any number of hardware and/or software elements suitable to provide the functions described herein as well as any other functions.

Producers 210 may comprise any one or more message producers that are or become known. One or more of message producers 210 may comprise a software component or module which produces messages for consumption by one or more message consumers. Such messages may conform to any current or future messaging format and/or protocol.

Similarly, consumers 220 may comprise any one or more message consumers, each of which may comprise a software component or module. One or more of consumers 220 may be an element of a software application and/or system that is different from the application/system of one or more producers 210. In this regard, each of consumers 220 and producers 210 may be located in any portion of a distributed computing architecture embodying one or more operating systems, languages, platforms, etc.

Model-consuming dispatcher 230 receives messages from producers 210 and routes the messages to appropriate ones of consumers 220. This routing is based on hierarchical relationship model 240. Hierarchical relationship model 240 defines logical and/or semantic relationships among producers 210 and consumers 220. Hierarchical relationship model 240 may be stored within any number of storage devices that are or become known. As a result, and as will be illustrated in examples below, message routing and filtering may be determined by semantic-rich rules applied to model 240.

Figure 3:
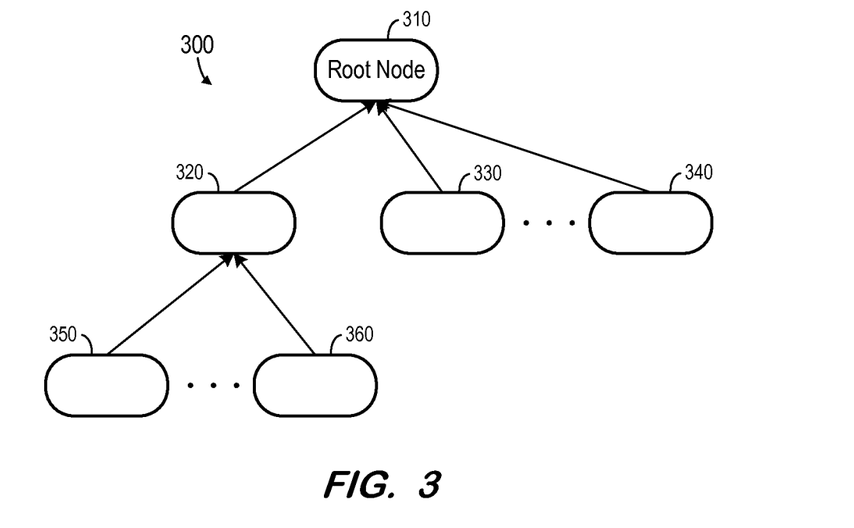
FIG. 3 illustrates a hierarchical relationship model according to some embodiments.

Hierarchical relationship model 300 illustrates the structure of hierarchical relationship model 240 according to some embodiments. Hierarchical relationship model 300 includes nodes 310 through 360 assembled in a tree-like structure of parent-child(ren) relationships. Embodiments are not limited to the structure of model 300.

Root node 310 is associated with child nodes 320 through 340, which may be referred to as "child" nodes of root node 310. Similarly, nodes 350 and 360 may be considered child nodes of node 320 and grandchild nodes of root node 310. More generally, nodes 320 through 360 are descendent nodes of root node 310, and nodes 350 and 360 are descendent nodes of node 320.

According to some embodiments, each node of hierarchical relationship model 240/300 is associated with a topic, one or more of message producers 210, and one or more of message consumers 220. All nodes except root node 310 are also associated with one parent node. Moreover, each node may be associated with one or more child nodes.

Figure 4:
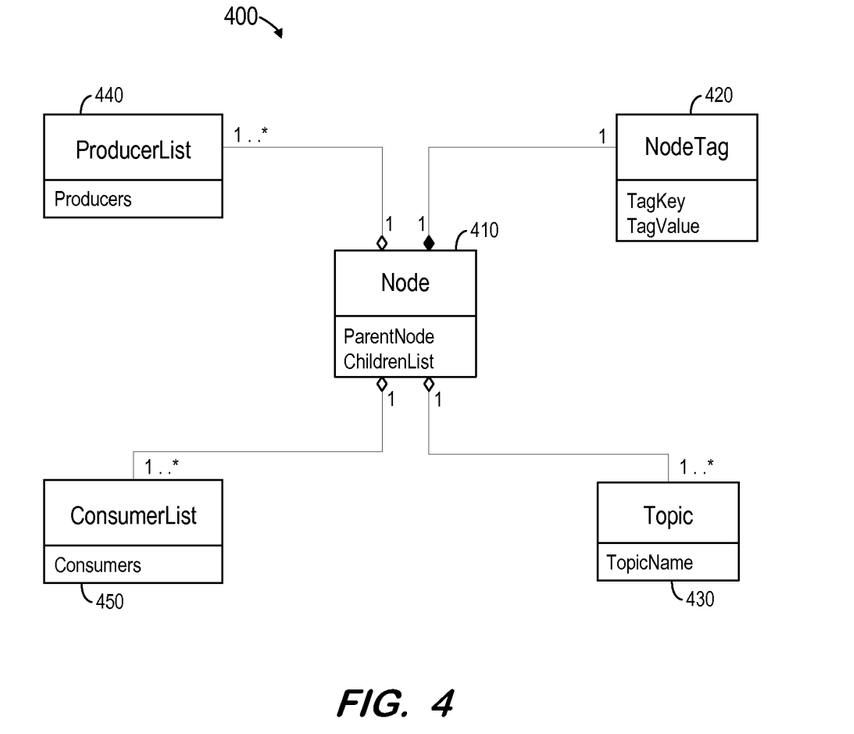
FIG. 4 is a UML class diagram according to some embodiments.

FIG. 4 presents UML class diagram 400 of hierarchical relationship model 240 according to some embodiments. As illustrated, each node 410 is associated with a ParentNode attribute which points to its parent (e.g., Null if the node is a root node), and a ChildrenList attribute which lists child nodes (if any) of the node. Node 410 is associated with NodeTag 420, which is a string providing semantic meaning to the node (e.g., Parent Company, Financial Department, Division, etc.).

Topic 430 may reflect a messaging topic as is known. For example, producers may generate events/messages to the selected topics, and consumers may subscribe to their interested topics by specifying topic names. However, unlike known systems, hierarchical relationship model 240 may reflect logical and semantic relationships between various topics (i.e., by virtue of their associated nodes, consumers and/or producers).

ProducerList 440 is used to associate producers with a selected node, and, by extenstion, with the one or more topics associated with the node. Similarly, ConsumerList 450 associates consumers with a node and with the one or more topics which are associated with the node.

According to some embodiments, a hierarchical assemblage of nodes as described herein facilitates the expression of semantic/logical relationships. The associated node tags may also annotate business meanings behind a software implementation. Producers and consumers may therefore attach themselves to a node that reflects their functional/semantic scope. A producer (or a consumer) may "register" with a particular node (or topic) before or during runtime in order to be added to the listed producers (or consumers) associated with the node. Producers and consumers are thereafter further enriched with a hierarchical relationship depending on the nodes to which they are attached.

The nodes themselves may represent any suitable logical entities which exhibit hierarchical relationships. Examples include User Interface (UI) containers, geographic regions, and positions in a business organizational chart.

Figure 5:
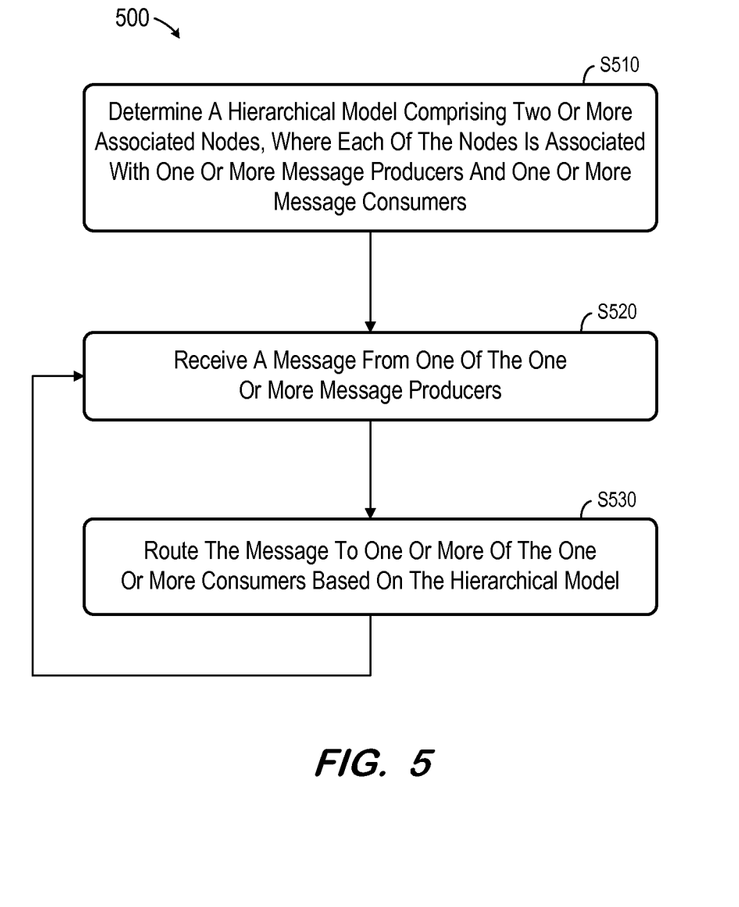
FIG. 5 is a flow diagram of a process according to some embodiments.

FIG. 5 is a flow diagram of process 500 according to some embodiments. Process 500 may be executed by a computing device and/or embodied in processor-executable program code stored on a non-transitory computer-readable medium. Embodiments of process 500 are not limited to the examples described below.

Process 500 may be executed to route messages according to some embodiments. As described above, such routing is based on a hierarchical model of two or more associated nodes, where each of the nodes is associated with one or more message producers and one or more message consumers.

Accordingly, a hierarchical model is initially determined at S510. As mentioned above, the hierarchical model includes two or more associated nodes, where each of the nodes is associated with one or more message producers and one or more message consumers. A hierarchical model according to some embodiments may also include other nodes which are associated to at least one other node, but which might not be associated with a message consumer and/or might not be associated with a message producer. The nodes of the hierarchical model according to some embodiments may comprise instances of Node 410 of class diagram 400, associated with instances of classes 420 through 450 as illustrated therein.

The hierarchical model may be embodied in any type of suitable data structure. For example, the hierarchical model may be specified in database tables which reflect the structure of class diagram 400. The data structure may be stored in any one or more storage devices, including but not limited to Random Access Memory and a hard disk drive.

Determination of the hierarchical model at S510 may include retrieval of a previously-created hierarchical model from a memory (i.e., a storage device). In some embodiments, the determination at S510 also includes creation of the hierarchical model. For example, a software application developer may generate a hierarchical model to represent relationships within the application and thereby facilitate desired functionality.

Generation of the hierarchical model may initially entail defining the nodes of the model. The nodes may be defined based on a consideration of how messages are distributed within functional units of the system. For example, the nodes may mimic the organizational structure of a business with which the software application is associated. On the other hand, the nodes may mimic the event-originating (UI) structure of the software application.

Each node is assigned a unique node tag which describes its meaning, and the nodes are assembled into a hierarchy based on their relationships to one another. The relationships (and the hierarchy) may be self-evident in view of the definitions of the nodes. Next, one or more topics are assigned to each node.

Finally, each node of the hierarchical model is associated with zero or more message producers and message consumers. This association may occur at design time and/or at runtime (e.g., via an Application Programming Interface).

An example of a hierarchical model will now be provided in the context of a UI. Most UI layouts consist of a hierarchy of containers. The hierarchy can be described as a tree, with the base application container represented as the root node and each other UI container as a child node descendant from the base application container.

Figure 6:
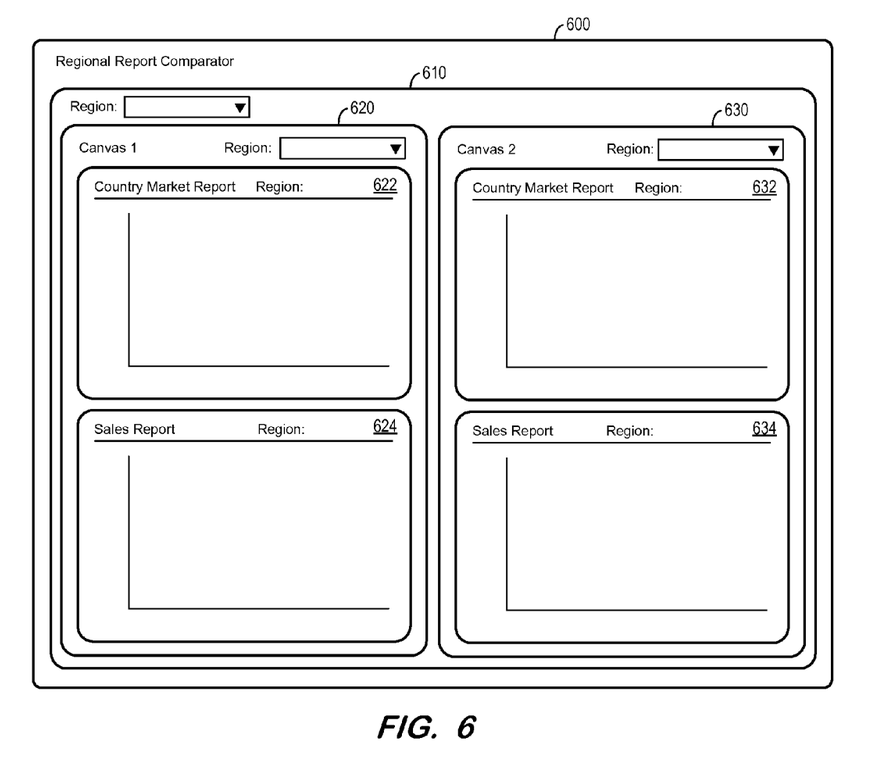
FIG. 6 is an outward view of a user interface according to some embodiments.
Figure 7:
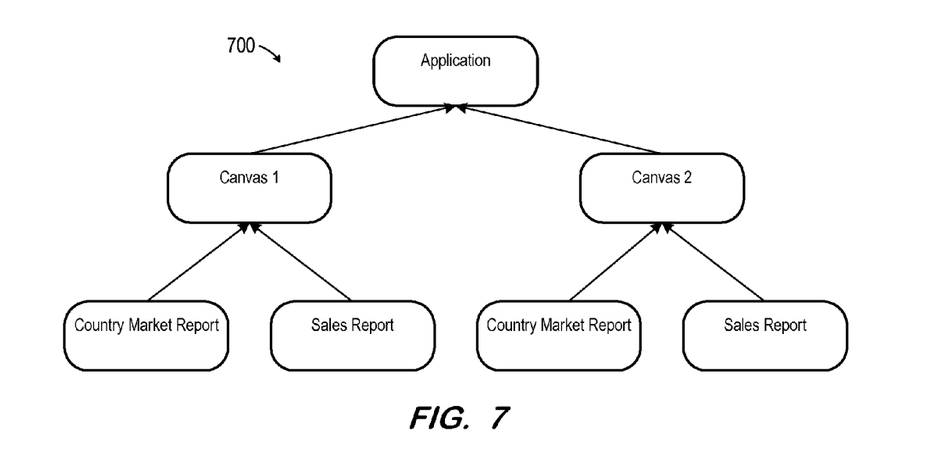
FIG. 7 illustrates a hierarchical relationship model according to some embodiments.

FIG. 6 is a screenshot of window 600 of a software application. Window 600 includes application UI 610, which itself contains canvases 620 and 630. Canvas 620 includes report widgets 622 and 624, while canvas 630 includes report widgets 632 and 634. Accordingly, application UI 610 creates three layers of scope. FIG. 7 depicts hierarchical model 700 corresponding to application UI 610 according to some embodiments.

Returning to process 500, a message is received from one or more message producers at S520. With reference to system 200, model-consuming message dispatcher 230 may receive a message from one of producers 210 at S520. Next, at S530, the message is routed to one or more message consumers based on the hierarchical model.

In an initial example, it will be assumed that application UI 610 sets its "Region" to North America at S520. Dispatcher 230 determines that this event is to be fired to every lower layer of scope. Model-consuming message dispatcher 230 may therefore perform a depth-first search, beginning on a node where application UI 610 is associated as a message producer, and then searching for each child node with which a UI container is associated as a message consumer of update events for this data. More particularly, dispatcher 230 may employ logic to perform a depth-first search to find all message consumers associated with a node and all its descendants, and to route the event to the found message consumers. An example of the logic of the depth-first search is expressed in the following pseudo-code.

```
UpdateDescendantConsumers(startNode, topicKey, updateEvent)
    nodesToVisit = empty stack;
    nodesToVisit.push(startNode);
    while not nodesToVisit.empty do
        searchNode = nodesToVisit.pop( );
        topic = searchNode.getTopic(topicKey)
        if topic != null
            for each consumer in topic.consumers do
                consumer.dispatchEvent(updateEvent);
        for each childNode in searchNode.children do
            nodesToVisit.push(childNode)
```

Figure 8:
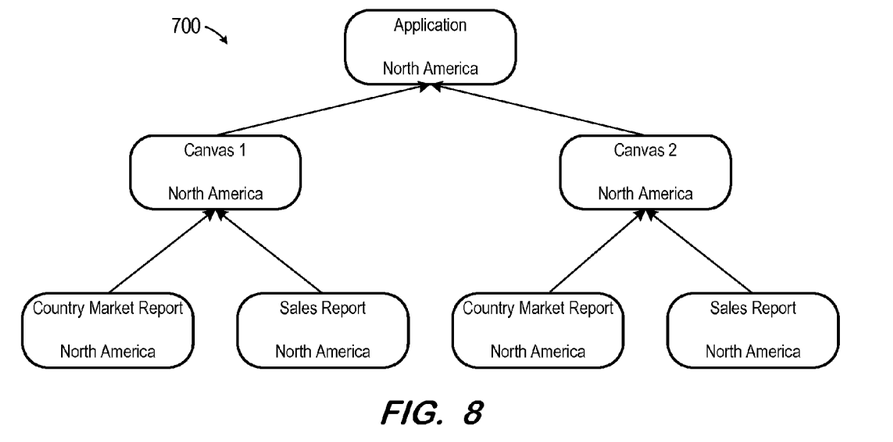
FIG. 8 illustrates application of routing logic based on a hierarchical relationship model according to some embodiments.
Figure 9:
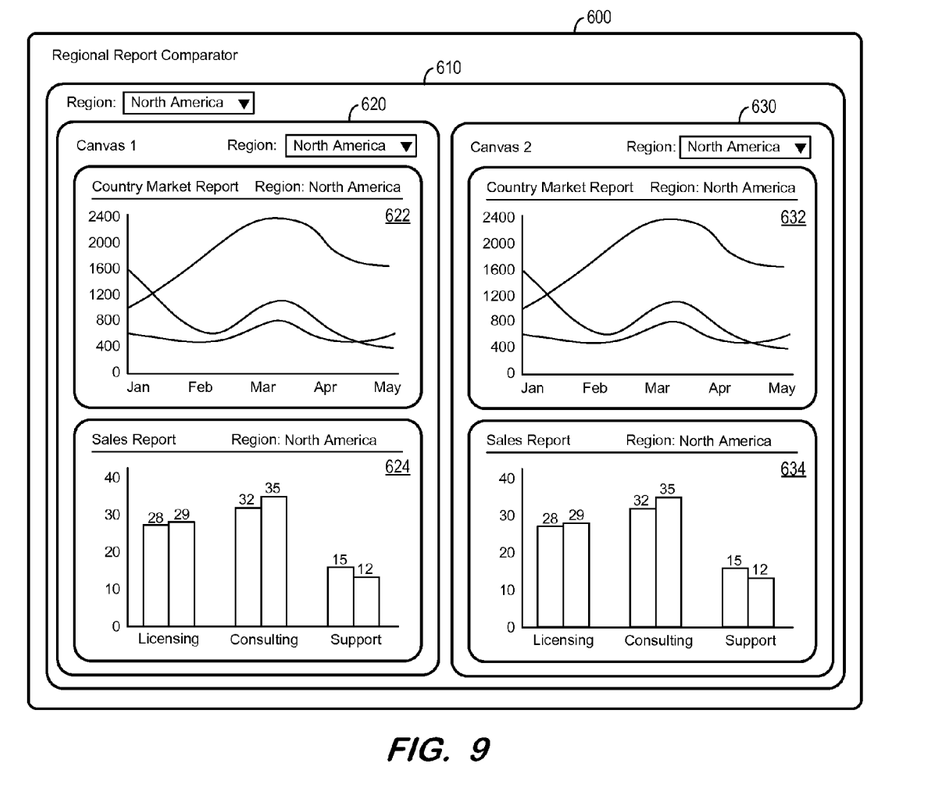
FIG. 9 is an outward view of a user interface according to some embodiments.

FIG. 8 illustrates message routing at S530 based on model 700 according to the above example. As shown, the event has been routed to the message consumers of every node descending from the root node. FIG. 9 shows window 600 which results from the message routing. Canvases 620 and 630 (and their widgets 622, 624, 632 and 634) have received the message and have set their region values accordingly.

Flow may return from S530 to S520 in order to receive and route additional messages. Embodiments may employ many different routing and searching methods by using tree traversal logic that is or becomes known. For example, UI 610 is designed to provide comparisons by allowing a user to set canvas 620 independently from application UI 610. Thereafter, canvas 620 should no longer listen for region updates on the parent node (i.e., the node associated with application UI 610) since its node has become a producer node. The above logic may be extended to implement this routing. Such extended logic may filter out updates from any producers from a higher (i.e., ancestor) node if a producer of the same topic is included in the model region of interest. An example of the logic for filtering is expressed in the following pseudo-code.

```
updateDescendantConsumers(startNode, topicKey, updateEvent)
    nodesToVisit = empty stack;
    nodesToVisit.push(startNode);
    while not nodesToVisit.empty do
        searchNode = nodesToVisit.pop( );
        topic = searchNode.getTopic(topicKey)
        if topic != null
            for each consumer in topic.consumers do
                consumer.dispatchEvent(updateEvent);
        for each childNode in searchNode.children do
            if childNode.getTopic(topicKey).hasProducer( )
                /*filter-->*/
                nodesToVisit.push(childNode)
```

Figure 10:
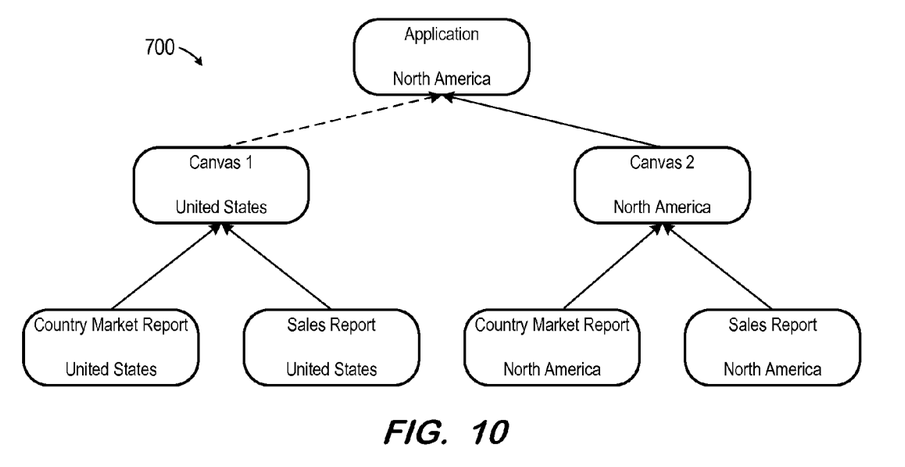
FIG. 10 illustrates application of routing logic based on a hierarchical relationship model according to some embodiments.
Figure 11:
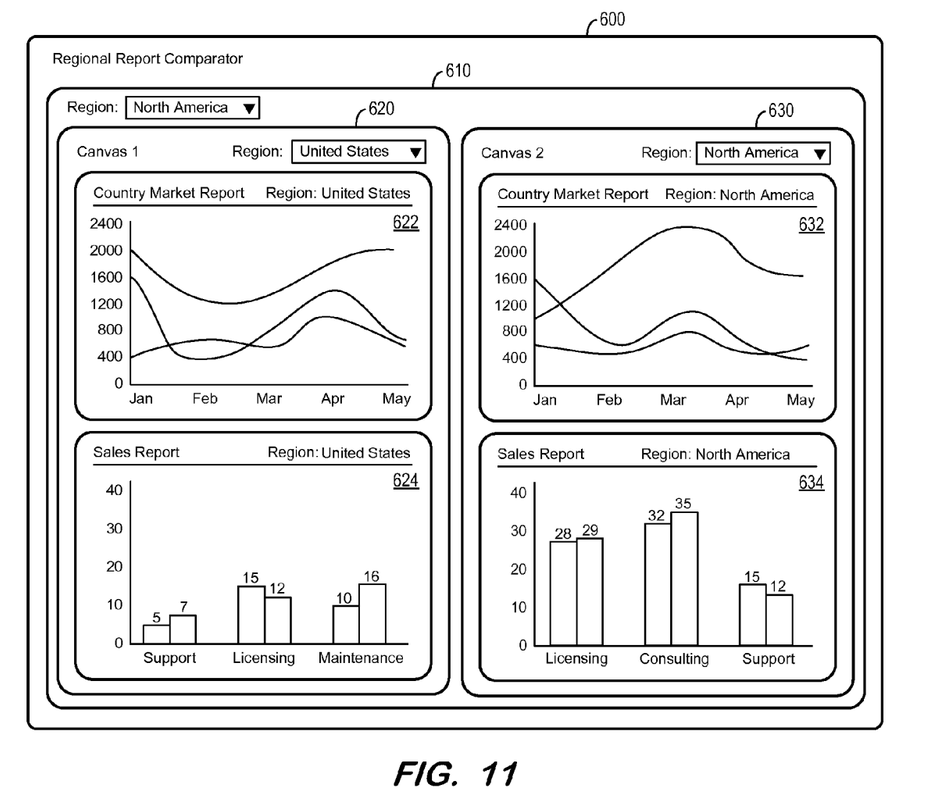
FIG. 11 is an outward view of a user interface according to some embodiments.

FIG. 10 illustrates model 700 after the region of canvas 620 has been set to "United States" and the above logic is applied. The node of canvas 620 will still reference its parent node, as depicted by the dashed line of FIG. 10. FIG. 11 illustrates corresponding changes to widgets 622 and 624.

Figure 12:
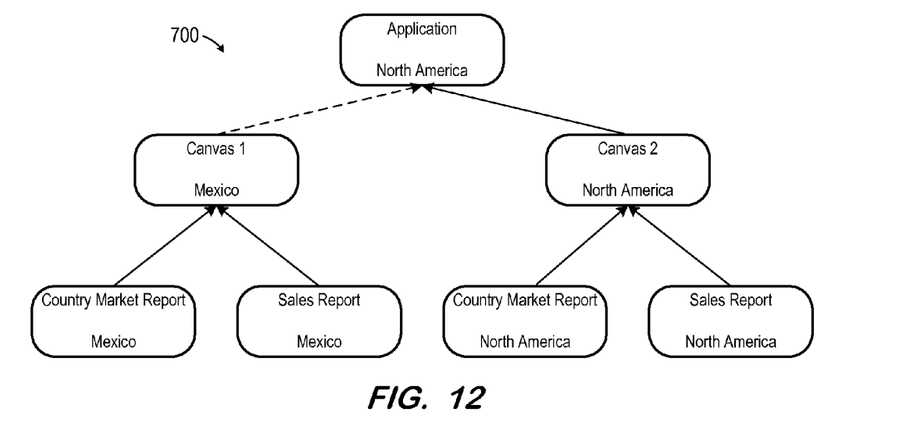
FIG. 12 illustrates application of routing logic based on a hierarchical relationship model according to some embodiments.
Figure 13:
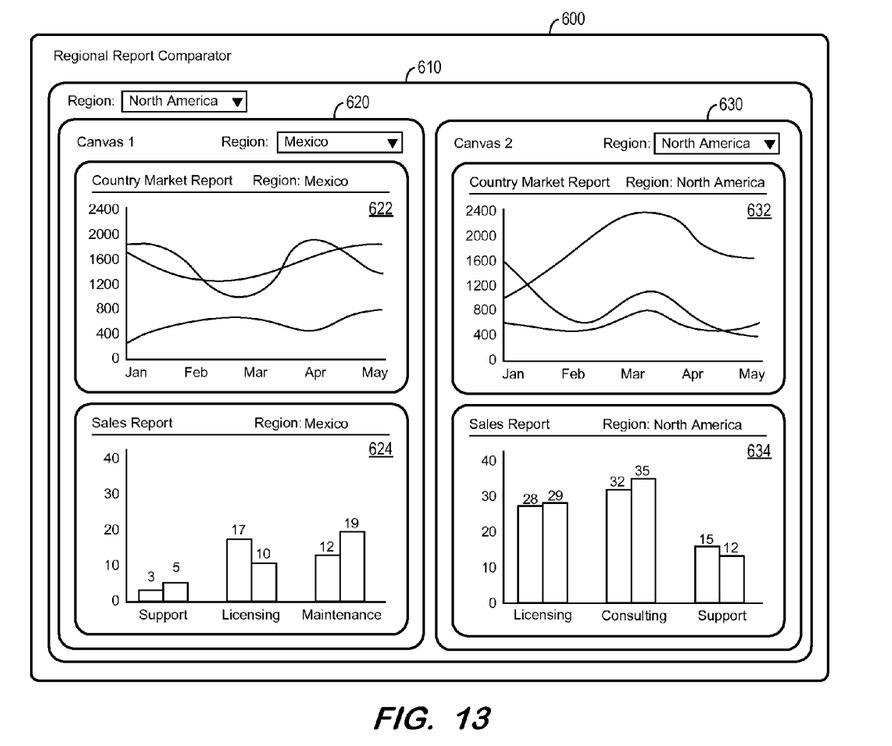
FIG. 13 is an outward view of a user interface according to some embodiments.

Similarly, any change to the region of canvas 620 is only scoped within canvas 620 (i.e., to widgets 622 and 624). In other words, updates to canvas 620 should not be routed to widgets 632 and 634 of canvas 630. FIG. 12 illustrates a situation in which the region of canvas 620 is set to "Mexico" and routing is performed at S530 according to the latter logic above. Accordingly, the update event will be routed to widgets 622 and 624, while widgets 632 and 634 will not receive this update event. FIG. 13 illustrates corresponding changes to widgets 622 and 624 and a lack of changes to widgets 632 and 634.

In contrast to the foregoing operation, conventional dispatchers as described in the Background cannot easily group listeners and topics, and route events to a particular grouping. Accordingly, these dispatchers are deficient in cases where an event on a parent container must be propagated to each sub-container located within the parent container, but ignored by containers not within the parent container.

Figure 14:
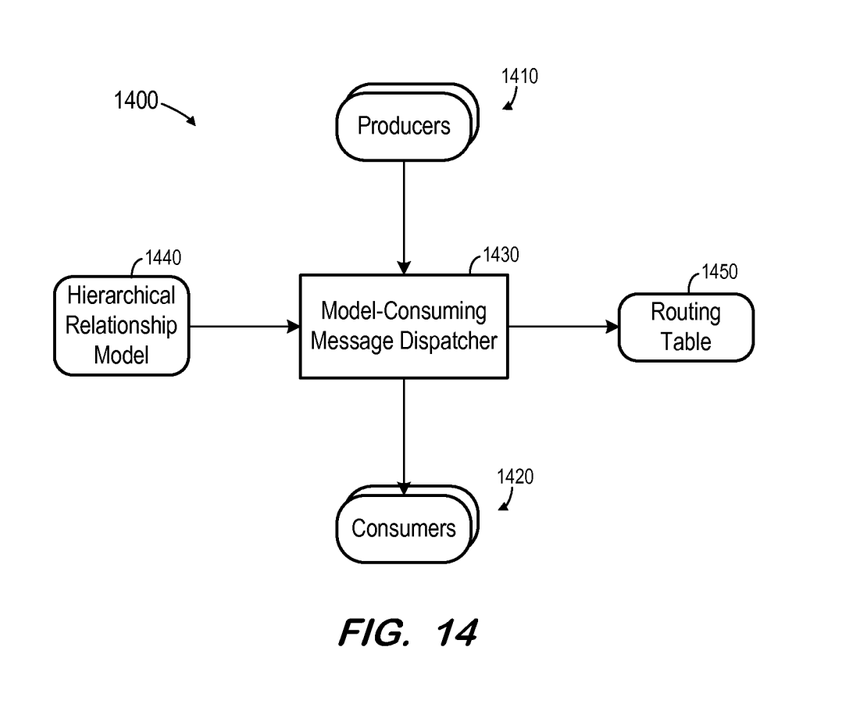
FIG. 14 is a block diagram illustrating a messaging system according to some embodiments.

FIG. 14 is a block diagram of system 1400 according to some embodiments. System 1400 may be implemented using any of the alternatives described above with respect to system 200. Moreover, the elements of system 1400 may be implemented as described with respect to identically-named elements of system 200.

Model-consuming dispatcher 1430 may perform process 500 to route messages based on hierarchical relationship model 1440. More particularly, model-consuming dispatcher 1430 may generate routing table 1450 based on hierarchical relationship model 1440 and based on those producers 1410 and consumers 1420 which have registered with topics (and therefore associated themselves with corresponding nodes) of hierarchical relationship model 1440. Even more particularly, dispatcher 1430 may generate routing table based on model 1440 and on logic which is intended to govern routing based on model 1440 as described above. Accordingly, after receipt of a message at S520, dispatcher 1430 consults routing table 1450 to route the message at S530. System 1400 may conserve resources by limiting the performance of intensive computations to once during initialization.

Figure 15:
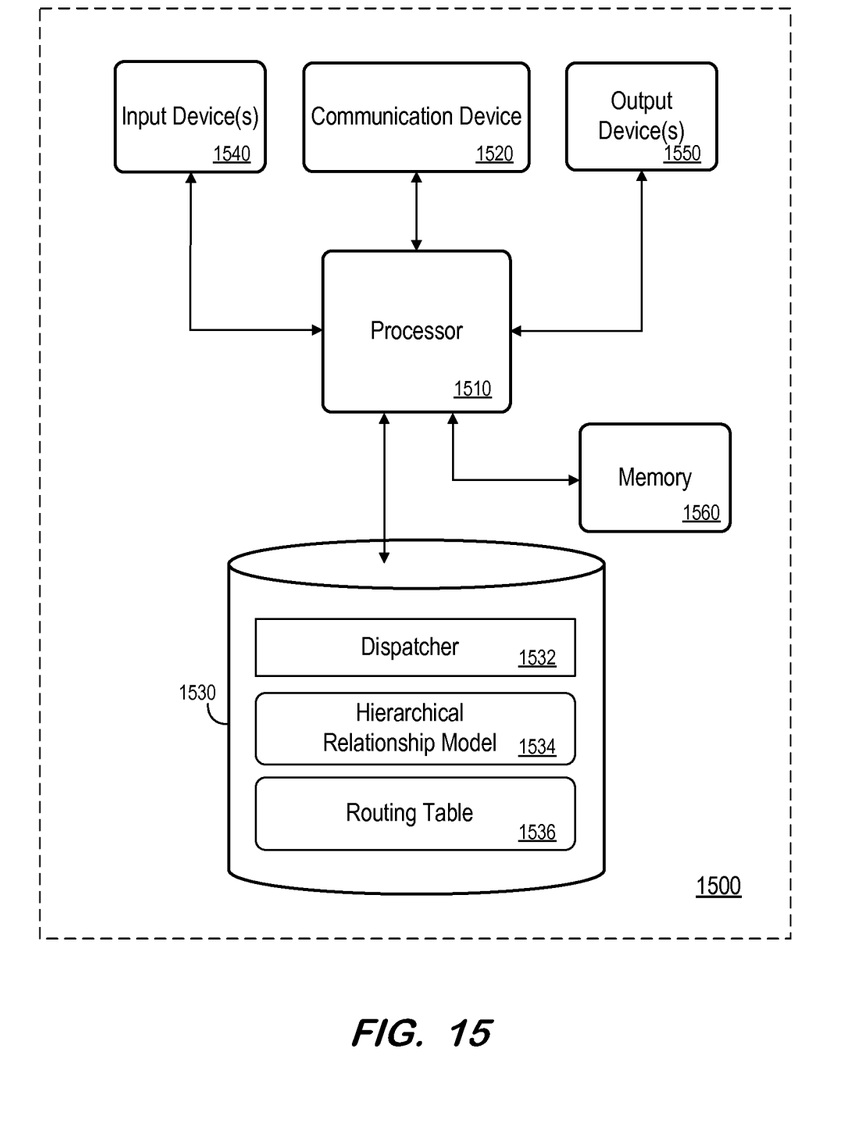
FIG. 15 is a block diagram of a computing system according to some embodiments.

FIG. 15 is a block diagram of apparatus 1500 according to some embodiments. Apparatus 1500 may comprise a general-purpose computing apparatus and may execute program code to perform any of the functions described herein. Apparatus 1500 may comprise an implementation of systems 200 and/or 1400. Apparatus 1500 may include other unshown elements according to some embodiments.

Apparatus 1500 includes processor 1510 operatively coupled to communication device 1520, data storage device 1530, one or more input devices 1540, one or more output devices 1550 and memory 1560. Communication device 1520 may facilitate communication with external devices, such as an external design tool. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into apparatus 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM).

Dispatcher 1532 of data storage device 1530 may comprise program code executable by processor 1510 to provide functions described herein, including but not limited to process 500. Embodiments are not limited to execution of these functions by a single apparatus. Hierarchical relationship model 1534 may comprise a data structure including associated nodes as described herein, while routing table 1536 may be based on hierarchical relationship model 1534 and used by dispatcher 1532 to route messages. Data storage device 1530 may also store data and other program code for providing additional functionality and/or which are necessary for operation thereof, such as device drivers, operating system files, etc.

Embodiments described herein are solely for the purpose of illustration. Those in the art will recognize other embodiments may be practiced with modifications and alterations to that described above.

What is claimed is:

1. A system comprising:
    a device comprising:
        a memory system storing processor-executable program code; and
        a processor to execute the processor-executable program code in order to cause the device to:
            determine a hierarchical relationship model defining at least one of a logical relationship and semantic relationship between at least one message producer and at least one message consumer, the hierarchical relationship model including two or more nodes, each of the nodes being specified as at least one message producer and at least one message consumer, as defined by the hierarchical relationship model, the hierarchical relationship model being an instance of data structure that comprises a root node and a plurality of nodes descending from the root node, where each of the plurality of nodes descending from the root node is defined by the hierarchical relationship model to be associated with a topic, a parent node, one or more child nodes, one or more of the at least one message producer, and one or more of the at least one message consumer; and
    a model-consuming dispatcher device comprising:
        a memory system storing processor-executable program code; and
        a processor to execute the processor-executable program code in order to cause the model-consuming dispatcher device to:
            receive a message from one of the at least one message producer; and
            route the message to one or more of the at least one message consumer based on the hierarchical model by logically traversing two or more nodes of the hierarchical relationship model by determining the topic associated with the message and identifying a first node of the plurality of nodes descending from the first node in the hierarchical relationship model that is associated with the topic and specified by the hierarchical relationship model as being a message consumer, the hierarchical relationship model being distinct from the message.

2. A system according to claim 1, wherein traversing the two or more nodes of the hierarchical relationship model comprises:
    identifying a first node of the plurality of nodes descending from the first node in the hierarchical relationship model that is associated with the topic;
    determining a first one or more of the at least one message consumer that are defined by the hierarchical relationship model to be associated with the first node;
    identifying a second one or more nodes descendant from the first node in the hierarchical relationship model; and
    determining a second one or more of the at least one message consumer, each of which are defined by the hierarchical relationship model to be associated with at least one of the second one or more nodes descending from the first node in the hierarchical relationship model,
    wherein routing the message comprises routing the message to the first one or more of the at least one message consumer and to the second one or more of the at least one message consumer.

3. A system according to claim 1, wherein traversing the two or more nodes of the hierarchical relationship model comprises:
    identifying a first node of the plurality of nodes descending from the first node in the hierarchical relationship model that is associated with the topic;
    determining a first one or more of the at least one message consumer that are defined by the hierarchical relationship model to be associated with the first node;
    identifying a second one or more nodes descendant from the first node in the hierarchical relationship model;
    associating the second one or more nodes descendant from the first node in the hierarchical relationship model with itself alone as the at least one message producer associated therewith; and
    determining a second one or more of the at least one message consumer, each of which are defined by the hierarchical relationship model to be associated with at least one of the second one or more nodes descendant from the first node in the hierarchical relationship model;
    wherein routing the message comprises routing the message to the first one or more of the at least one message consumer and to the second one or more of the at least one message consumer.

4. A system according to claim 1, the processor further to execute the processor-executable program code in order to cause the device to:
    receive a second message from a second one of the one or more of the at least one message producer;
    traverse the hierarchical relationship model based on the first logic to determine a second one or more of the at least one message consumer; and
    route the second message to the second one or more of the at least one message consumer.

5. A non-transitory medium storing processor-executable program code, the program code executable by a device to:
    determine a hierarchical relationship model defining at least one of a logical relationship and semantic relationship between at least one message producer and at least one message consumer, the hierarchical relationship model including two or more nodes, each of the nodes being specified as at least one message producer and at least one message consumer, as defined by the hierarchical relationship model, the hierarchical model being an instance of data structure that comprises a root node and a plurality of nodes descending from the root node, where each of the plurality of nodes descending from the root node is defined by the hierarchical relationship model to be associated with a topic, a parent node, one or more child nodes, one or more of the at least one message producer, and one or more of the at least one message consumer; and the program code executable by a model-consuming device to:
receive a message from one of the at least one message producer; and
route the message to one or more of the at least one message consumer based on the hierarchical model by logically traversing two or more nodes of the hierarchical relationship model by determining the topic associated with the message and identifying a first node of the plurality of nodes descending from the first node in the hierarchical relationship model that is associated with the topic and specified by the hierarchical relationship model as being a message consumer, the hierarchical relationship model being distinct from the message.

6. A medium according to claim 5, wherein traversing the two or more nodes of the hierarchical relationship model comprises:
identifying a first node of the plurality of nodes descending from the first node in the hierarchical relationship model that is associated with the topic;
determining a first one or more of the at least one message consumer that are defined by the hierarchical relationship model to be associated with the first node;
identifying a second one or more nodes descendant from the first node in the hierarchical relationship model; and
determining a second one or more of the at least one message consumer, each of which are defined by the hierarchical relationship model to be associated with at least one of the second one or more nodes descending from the first node in the hierarchical relationship model,
wherein routing the message comprises routing the message to the first one or more of the at least one message consumer and to the second one or more of the at least one message consumer.

7. A medium according to claim 5, wherein traversing the two or more nodes of the hierarchical relationship model comprises:
identifying a first node of the plurality of nodes descending from the first node in the hierarchical relationship model that is associated with the topic;
determining a first one or more of the at least one message consumer associated with the first node;
identifying a second one or more nodes descendant from the first node in the hierarchical relationship model;
associating the second one or more nodes descendant from the first node in the hierarchical relationship model with itself alone as the at least one message producer associated therewith; and
determining a second one or more of the at least one message consumer, each of which is defined by the hierarchical relationship model to be-associated with at least one of the second one or more nodes descendant from the first node in the hierarchical relationship model,
wherein routing the message comprises routing the message to the first one or more of the at least one message consumer and to the second one or more of the at least one message consumer, 8. A medium according to claim 5, the program code further executable by the device to:
receive a second message from a second one of the at least one message producer;
traverse the hierarchical relationship model based on the first logic to determine a second one or more of the at least one message consumer; and
route the second message to the second one or more of the of the least one message consumers.

9. A method implemented by a computing system in response to execution of program code by a processor of the computing system, comprising:
determining a hierarchical relationship model defining at least one of a logical relationship and semantic relationship between at least one message producer and at least one message consumer, the hierarchical relationship model including two or more nodes, each of the nodes being specified as at least one message producer and at least one message consumer, as defined by the hierarchical relationship model, the hierarchical relationship model being an instance of data structure that comprises a root node and a plurality of nodes descending from the root node, where each of the plurality of nodes descending from the root node is defined by the hierarchical relationship model to be associated with a topic, a parent node, one or more child nodes, one or more of the at least one message producer, and one or more of the at least one message consumer;
receiving, by a model-consuming dispatcher device, a message from one of the at least one message producer; and
routing, by the model-consuming dispatcher device, the message to one or more of the at least one message consumer based on the hierarchical model by logically traversing two or more nodes of the hierarchical relationship model by determining the topic associated with the message and identifying a first node of the plurality of nodes descending from the first node in the hierarchical relationship model that is associated with the topic and specified by the hierarchical relationship model as being a message consumer, the hierarchical model being distinct from the message.

10. A method according to claim 9, wherein traversing the two or more nodes of the hierarchical relationship model comprises:
determining a the topic associated with the message;
identifying a first node of the plurality of nodes descending from the first node in the hierarchical relationship model that is associated with the topic;
determining a first one or more of the at least one message consumer that are defined by the hierarchical relationship model to be associated with the first node;
identifying a second one or more nodes descendant from the first node in the hierarchical relationship model; and
determining a second one or more of the at least one message consumer, each of which are defined by the hierarchical relationship model to be associated with at least one of the second one or more nodes descending from the first node in the hierarchical relationship model , wherein routing the message comprises routing the message to the first one or more of the at least one message consumer and to the second one or more of the at least one message consumer.

11. A method according to claim 9, wherein traversing the two or more nodes of the hierarchical relationship model comprises:

determining the topic associated with the message;

identifying a first node of the plurality of nodes descending from the first node in the hierarchical relationship model that is associated with the topic;

determining a first one or more of the at least one message consumer that are defined by the hierarchical relationship model to be associated with the first node;

identifying a second one or more nodes descendant from the first node in the hierarchical relationship model;

associating the second one or more nodes descendant from the first node in the hierarchical relationship model with itself alone as the at least one message producer associated therewith; and     determining a second one or more of the at least one message consumer, each of which are defined by the hierarchical relationship model to be associated with at least one of the second one or more nodes descendant from the first node in the hierarchical relationship model;

wherein routing the message comprises routing the message to the first one or more of the at least one message consumer and to the second one or more of the at least one message consumer.

12. A method according to claim 9, further comprising:

receive a second message from a second one of the one or more of the at least one message producer;

traverse the hierarchical relationship model based on the first logic to determine a second one or more of the at least one message consumer; and route the second message to the second one or more of the at least one message consumer.

\* \* \* \* \*